United States Patent
Ferraioli

(10) Patent No.: US 7,487,979 B2
(45) Date of Patent: Feb. 10, 2009

(54) TRANSPORTER WITH INTEGRAL MEDIA ENTERTAINMENT AND EDUCATION CENTER FOR A BABY

(76) Inventor: Jennie Ferraioli, 313 Foster Ave., Sayville, NY (US) 11782

( * ) Notice: Subject to any disclaimer, the term of this patent is extended or adjusted under 35 U.S.C. 154(b) by 227 days.

(21) Appl. No.: 11/503,788

(22) Filed: Aug. 14, 2006

(65) Prior Publication Data
US 2008/0042384 A1 Feb. 21, 2008

Related U.S. Application Data

(60) Provisional application No. 60/787,088, filed on Mar. 30, 2006.

(51) Int. Cl.
*B62B 9/10* (2006.01)
*B62B 9/14* (2006.01)
(52) U.S. Cl. ............... 280/47.38; 280/47.25; 280/647; 280/642; 280/650
(58) Field of Classification Search ............ 280/33.992, 280/33.993, 642, 644, 647–650, 87.051, 280/47.25, 47.38, 79.2, 250.1
See application file for complete search history.

(56) References Cited

U.S. PATENT DOCUMENTS

| | | | | |
|---|---|---|---|---|
| 4,979,777 A * | 12/1990 | Takada | ...................... | 297/250.1 |
| 5,624,156 A * | 4/1997 | Leal et al. | ................. | 297/217.4 |
| 5,645,204 A | 7/1997 | Struzer | ......................... | 224/547 |
| 5,704,527 A | 1/1998 | Struzer | ......................... | 224/547 |
| 5,836,051 A * | 11/1998 | Myers | .......................... | 16/436 |
| 5,842,715 A * | 12/1998 | Jones | .......................... | 280/727 |
| 5,882,208 A | 3/1999 | Fulop | .......................... | 434/365 |
| 6,068,285 A * | 5/2000 | Jackson et al. | ............... | 280/650 |
| 6,746,030 B1 * | 6/2004 | Bartlett | ..................... | 280/47.38 |
| 6,880,850 B2 * | 4/2005 | Hsia | ............................ | 280/642 |
| 6,960,171 B2 | 11/2005 | Sanders | ..................... | 600/558 |
| 6,979,004 B2 | 12/2005 | Otterlee et al. | ......... | 280/33.993 |
| 7,039,207 B1 * | 5/2006 | Elrod et al. | .................. | 381/301 |
| 7,065,319 B1 * | 6/2006 | Hartley | .................... | 434/307 R |
| 7,077,405 B2 * | 7/2006 | Akpom | ..................... | 280/47.38 |
| 7,229,083 B2 * | 6/2007 | Arai et al. | ................. | 280/47.38 |
| 2001/0028301 A1 * | 10/2001 | Geiger et al. | .............. | 340/5.91 |
| 2004/0259070 A1 | 12/2004 | Goodstein | ................... | 434/428 |
| 2005/0263653 A1 * | 12/2005 | Brown | ...................... | 248/125.9 |
| 2006/0113342 A1 * | 6/2006 | Hampton et al. | ............ | 224/409 |
| 2006/0150207 A1 * | 7/2006 | Tutmaz et al. | .............. | 720/600 |

* cited by examiner

*Primary Examiner*—Christopher P Ellis
*Assistant Examiner*—Vaughn T Coolman
(74) *Attorney, Agent, or Firm*—Bernard S. Hoffman

(57) ABSTRACT

A transporter with integral media entertainment and education center for a baby. The transporter with integral media entertainment and education center includes a stroller with a hood and a handle, a DVD player, speakers, a controller, and a power source interface. The DVD player replaceably depends from the hood of the stroller and is viewed by the baby lying on the back in the stroller to entertain and educate the baby. The speakers are in electrical communication with the DVD player, are at the stroller, and are listened to by the baby lying in the stroller. The controller is at the handle of the stroller and is in electrical communication with, and controls, the DVD player. The power source interface is at the stroller, is in electrical communication with the DVD player, and electrically communicates with a power source to power the DVD player.

9 Claims, 4 Drawing Sheets

TRANSPORTER WITH INTEGRAL MEDIA ENTERTAINMENT AND EDUCATION CENTER FOR A BABY

1. CROSS REFERENCE TO RELATED APPLICATIONS

The instant patent application is a nonprovisional patent application claiming priority from provisional patent application No. 60/787,088, filed on Mar. 30, 2006, and entitled CHILD CARRIER ENTERTAINMENT CENTER.

2. BACKGROUND OF THE INVENTION

A. Field of the Invention.

The embodiments of the present invention relate to a transporter for a baby, and more particularly, the embodiments of the present invention relate to a transporter with integral media entertainment and education center for a baby.

B. Description of the Prior Art

Child development studies have clearly demonstrated the benefits of early visual and audio stimulation for entertainment and education. Furthermore, such visual stimulation must be presented within the visual field of the infant, be of a form the infant can perceive, and be for a suitable period of time.

Infants between birth and six months of age typically spend a significant amount of time lying on their backs, facing upwards, in strollers. This position is now considered the healthiest for infants. While positioned in a stroller, an infant has nothing to provide visual and/or audio stimuli, except the inside of the stroller hood as manufactured. This customarily fails to meet the requirements for maximizing entertainment and education.

Conventional methods and apparatus for visual and audio stimulation of infants, such as crib mobiles, books, flash cards, and television are impractical, inappropriate, and/or ineffective for infants lying on their backs, facing upwards, in strollers.

Crib mobiles allow an infant lying under them only to view their underside. This is typically small in surface area and limited in use. While typically entertaining to adults located nearby, mobiles often fail to adequately stimulate the infant. Additionally, crib mobiles are not well suited for strollers. As strollers are mobile in nature, movement of the stroller may generate a swinging motion of a mobile, which may present an unsafe condition for an infant lying therein. Furthermore, crib mobiles exhibit an inability to readily change the pictorial source of visual stimulation as is necessary to optimize entertainment and education.

Books and flash cards allow for such a changing of the pictorial source of visual stimulation, but require the assistance of an older individual to hold for, and read to, the infant.

Further, infants in strollers can become bored when awake and cry out making it difficult for mothers to go shopping, or even go out to lunch.

Thus, there exists a need for a stroller-implemented device that will allow an infant in the stroller to be entertained and educated and not become bored so as to allow the mother to enjoy her activities while baby is with her.

Numerous innovations for child entertainment devices have been provided in the prior art that will be described below in chronological order to show advancement of the art and which are incorporated herein by reference thereto. Even though these innovations may be suitable for the specific individual purposes to which they address, they each differ in structure and/or operation and/or purpose from the embodiments of the present invention in that they do not teach a transporter with integral media entertainment and education center for a baby.

(1) U.S. Pat. No. 5,645,204 to Struzer.

U.S. Pat. No. 5,645,204 issued to Struzer on Jul. 8, 1997 in class 224 and subclass 547 teaches a portable, attachable, light-weight, encased entertainment unit, adapted for mounting onto moving vehicles. The encasement box of the entertainment unit is equipped to fit onto corresponding modes of attachment, which are secured on vehicle, and which are designed to receive the encasement box, and therefore cooperate with the mounting of the entertainment unit. The entertainment unit includes at least one of a television, a radio, a cassette player, a CD player, a VCR, and any other electronic equipment deemed suitable. The encasement box of the entertainment unit is designed with a carved-out, semi-circular portion, meant to fit over tubular clips fastened to a place of attachment via screws and nuts. Square protrusions fit into square rings hanging from straps secured to other square rings fastened onto a place of attachment via the curved extensions, screws, and nuts. A female-headed, snap-studded lid cover meant to snap onto a male-headed, snap-studded material strap secured via loops in a material onto curved extensions on each end of the strap fastened to place of attachment by screws and nuts. A carved-out, rectangular portion onto which straps holding clip-attached rectangular rings loop onto. The clips meant to hook onto rings fastened onto place of attachment via their curved extensions, screws, and nuts. Adjustment apparatus are also included in all attachment modes to facilitate adaptation of the entertainment unit to a number of different heights.

(2) U.S. Pat. No. 5,704,527 to Struzer.

U.S. Pat. No. 5,704,527 issued to Struzer on Jan. 6, 1998 in class 224 and subclass 547 teaches a portable, attachable, light-weight, encased entertainment unit, adapted for mounting onto moving vehicles. The encasement box of the entertainment unit is equipped to fit onto corresponding modes of attachment, which are secured on vehicle, and which are designed to receive the encasement box, and therefore cooperate with the mounting of the entertainment unit. The entertainment unit includes at least one of a television, a radio, a cassette player, a CD player, a VCR, and any other electronic equipment deemed suitable. The encasement box of the entertainment unit is designed with a carved-out, semi-circular portion, meant to fit over tubular clips fastened to a place of attachment via screws and nuts. Square protrusions fit into square rings hanging from straps secured to other square rings fastened onto a place of attachment via the curved extensions, screws, and nuts. A female-headed, snap-studded lid cover meant to snap onto a male-headed, snap-studded material strap secured via loops in a material onto curved extensions on each end of the strap fastened to place of attachment by screws and nuts. A carved-out, rectangular portion onto which straps holding clip-attached rectangular rings loop onto. The clips meant to hook onto rings fastened onto place of attachment via their curved extensions, screws, and nuts. Adjustment apparatus are also included in all attachment modes to facilitate adaptation of the entertainment unit to a number of different heights.

(3) U.S. Pat. No. 5,882,208 to Fulop.

U.S. Pat. No. 5,882,208 issued to Fulop on Mar. 16, 1999 in class 434 and subclass 365 teaches a method for teaching and entertaining infants while lying on their back in a stroller with a hood. The method include first, attaching a planar member suitable for displaying visual images to an infant while the infant is lying on his back in the stroller and for mounting on an inside cover of a stroller hood to the stroller hood in such a way as to be within the visual field of the infant while the infant is lying on the back in the stroller, and second, using apparatus for attaching the planar member to the inside of the stroller hood.

(4) United States Patent Application Publication Number 2004/0259070 to Goodstein.

United States Patent Application Publication Number 2004/0259070 published to Goodstein on Dec. 23, 2004 in class 434 and subclass 428 teaches child/infant play and entertainment devices, including electronic displays providing applications of display technology to the child/infant toy and entertainment industry. Flexible displays are used in infant items requiring safety measures, such as no sharp corners, hard structures, or breakable parts. Battery powered devices provide portability and convenience, and remote programming connections are employed to provide wired or wireless reprogramming of the appearance and/or behavior of the child/infant play or entertainment device. Sound features may also be incorporated in synchrony with the visual display for further enhancing the play or entertainment experience.

(5) U.S. Pat. No. 6,960,171 to Sanders.

U.S. Pat. No. 6,960,171 issued to Sanders on Nov. 1, 2005 in class 600 and subclass 558 teaches an infant eye trainer mountable on a baby bottle for strengthening and developing infant eyesight. The device utilizes interchangeable media producing an image on a display, which may be viewed by the infant while drinking from the bottle. A variety of images designed to improve, strengthen, and facilitate infant eyesight development—both physically and cognitively—are selected for display. The device mounts onto the end of a baby bottle, thus placing it within an infant's focal range. The device may also utilize audiovisual stimuli to further develop infant eyesight and cognition.

(6) U.S. Pat. No. 6,979,004 to Otterlee et al

U.S. Pat. No. 6,979,004 issued to Otterlee et al. on Dec. 27, 2005 in class 280 and subclass 33.993 teaches a child carrier, including a seat portion including a seat, a backrest, and a floor. The child carrier further includes a substantially rigid body, at least partially surrounding and supporting the seat portion. The rigid body also includes substantially solid side surfaces, and at least partially defines a panel. In addition, the child carrier provides a plurality of wheels supporting the body, and a electronic device supported by the body.

It is apparent that numerous innovations for child entertainment devices have been provided in the prior art that are adapted to be used. Furthermore, even though these innovations may be suitable for the specific individual purposes to which they address, they would not be suitable for the purposes of the embodiments of the present invention as heretofore described, namely, a transporter with integral media entertainment and education center for a baby.

2. SUMMARY OF THE INVENTION

Thus, an object of the embodiments of the present invention is to provide a transporter with integral media entertainment and education center for a baby that avoids the disadvantages of the prior art.

Briefly stated, another object of the embodiments of the present invention is to provide a transporter with integral media entertainment and education center for a baby. The transporter with integral media entertainment and education center includes a stroller with a hood and a handle, a DVD player, speakers, a controller, and a power source interface. The DVD player replaceably depends from the hood of the stroller and is viewed by the baby lying on the back in the stroller to entertain and educate the baby. The speakers are in electrical communication with the DVD player, are at the stroller, and are listened to by the baby lying in the stroller. The controller is at the handle of the stroller and is in electrical communication with, and controls, the DVD player. The power source interface is at the stroller, is in electrical communication with the DVD player, and electrically communicates with a power source to power the DVD player.

The novel features considered characteristic of the embodiments of the present invention are set forth in the appended claims. The embodiments of the present invention themselves, however, both as to their construction and their method of operation, together with additional objects and advantages thereof, will be best understood from the following description of the specific embodiments when read and understood in connection with the accompanying drawing.

3. BRIEF DESCRIPTION OF THE DRAWING

The figures of the drawing are briefly described as follows.

Figure 1:
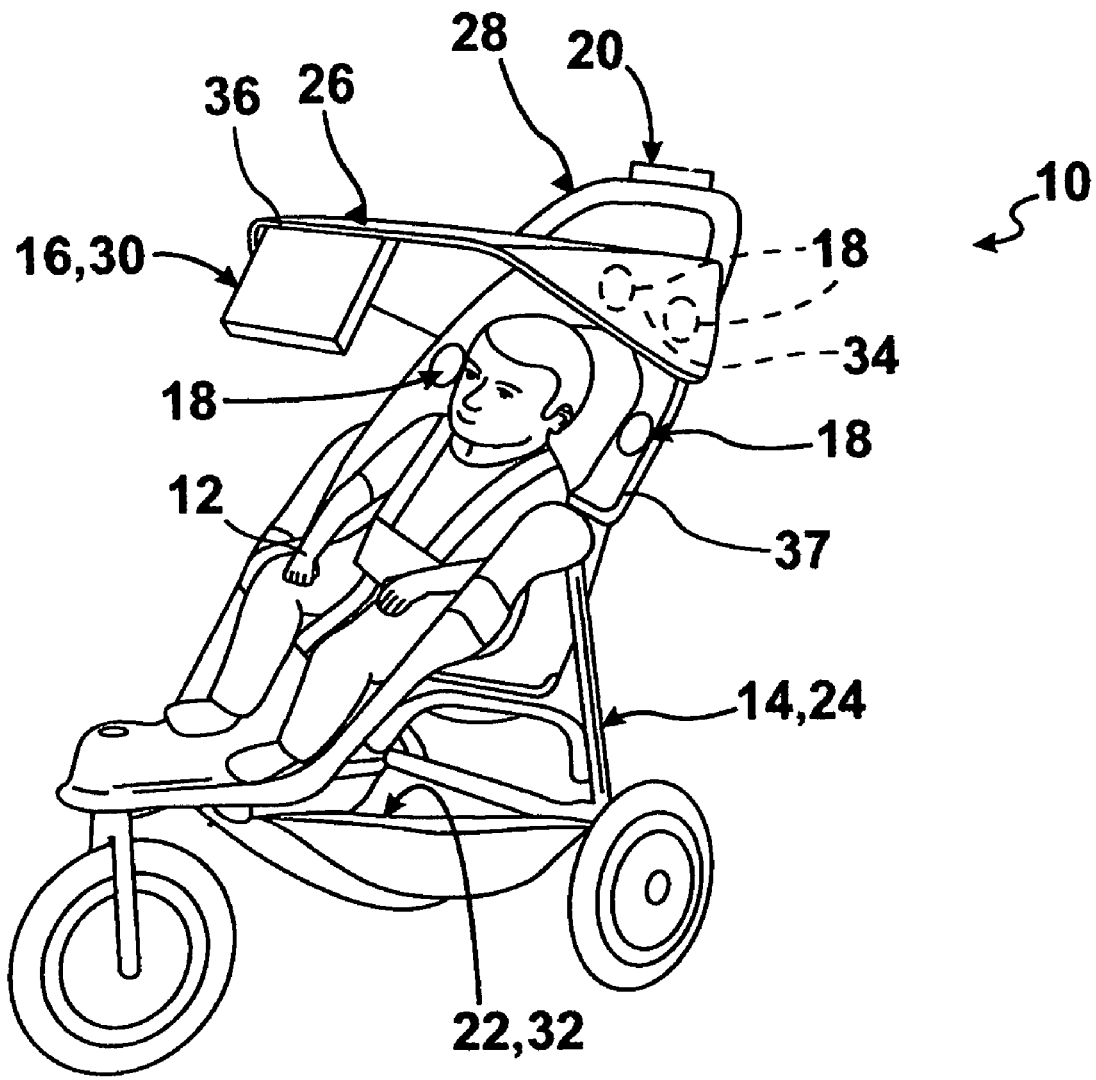
FIG. 1 is a diagrammatic perspective view of the transporter with integral media entertainment and education center for a baby of the embodiments of the present invention.
Figure 3:
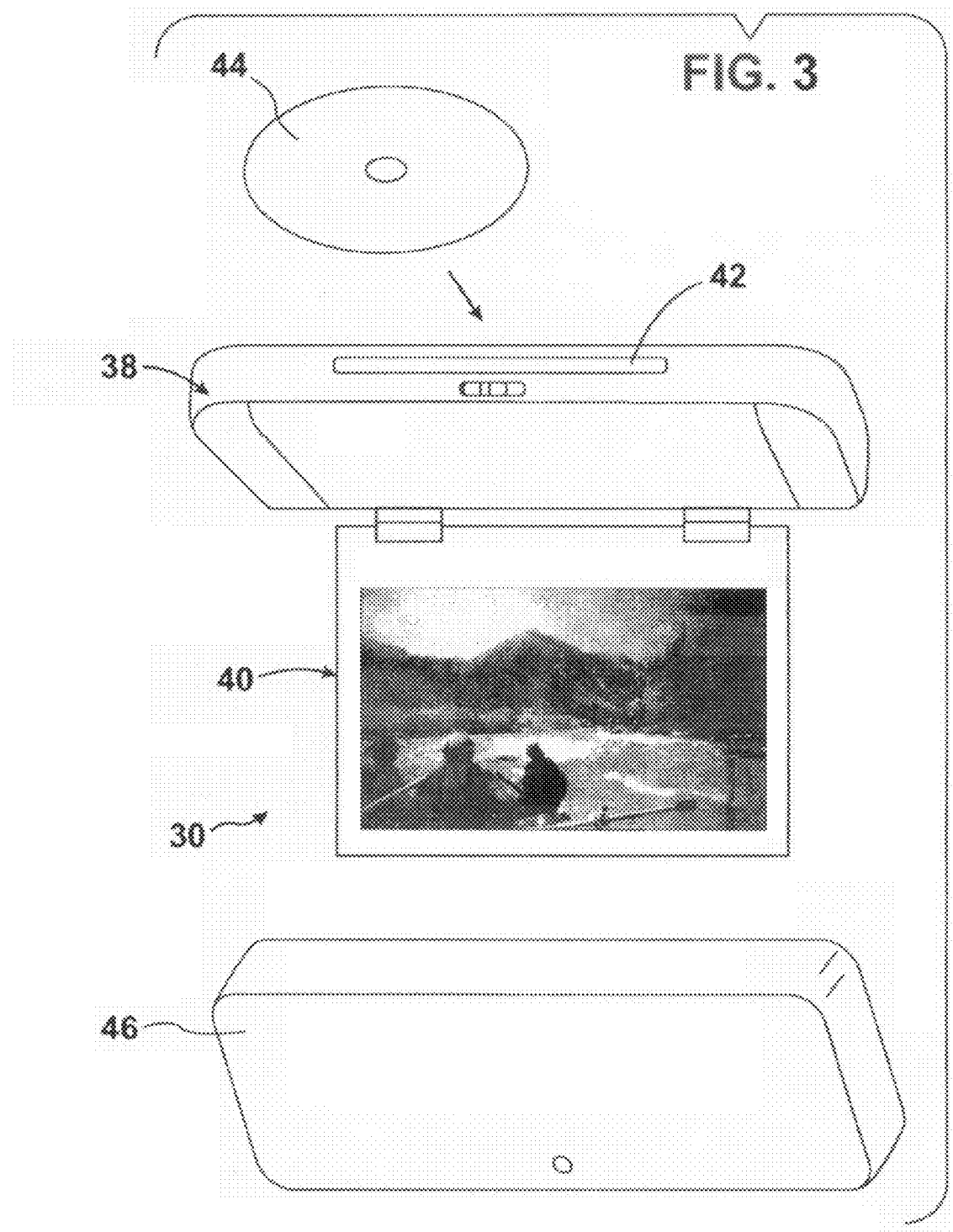
Figure 4:
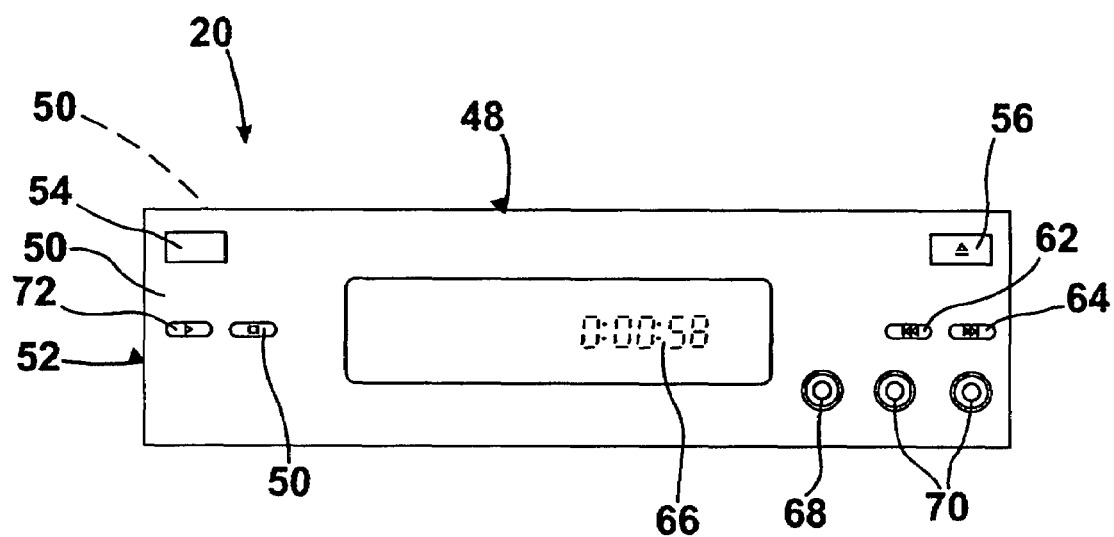

FIG. 3 is an enlarged diagrammatic perspective view of the area generally enclosed by the dotted curve identified by ARROW 3 in FIG. 1 of the media entertainment and education center of the transporter with integral media entertainment and education center for a baby of the embodiments of the present invention; and FIG. 4 is an enlarged diagrammatic perspective view of the area generally enclosed by the dotted curve identified by ARROW 4 in FIG. 1 of the controller of the transporter with integral media entertainment and education center for a baby of the embodiments of the present invention.

4. LIST OF REFERENCE NUMERALS UTILIZED IN THE DRAWING

A. General.

10 transporter with integral media entertainment and education center of embodiment of present invention for baby 12

12 baby

B. Transporter with Integral Media Entertainment and Education Center 10.

14 transporter

16 media center for viewing by baby 12 lying in stroller 24 of transporter 14 for entertaining and educating baby 12

18 speakers for listening by baby 12 lying in stroller 24

20 controller

22 power source interface for electrically communicating with power source 32 for powering DVD player 30 of media center 16

24 stroller of transporter 14

26 hood of stroller 24 of transporter 14

28 handle of stroller 24 of transporter 14

30 DVD player of media center 16

32 power source for powering DVD player 30 of media center 16
34 interior of hood 26 of stroller 24 of transporter 14
36 frame of hood 26 of stroller 24 of transporter 14
37 frame of stroller 24 of transporter 14

C. DVD Player 30 of Media Center 16.
38 base of DVD player 30 of media center 16
40 screen of DVD player 30 of media center 16
42 blind slot 42 in base 38 of DVD player 30 of media center 16 for receiving DVD disc 44 for viewing by baby 12 lying on back in stroller 24 of transporter 14
44 DVD disc for viewing by baby 12 lying on back in stroller 24 of transporter 14
46 bag of DVD player 30

D. Controller 20.
48 housing of controller 20
50 circuitry of controller 20
52 control panel of controller 20
54 power button of control panel 52 of controller 20
56 eject button of control panel 52 of controller 20 when depressed is for ejecting DVD disc 44 from DVD player 30 of media center 16
58 play/stop button of control panel 52 of controller 20 when depressed is for either playing or stopping playing DVD disc 44
60 mode button of control panel 52 of controller 20 when depressed is for toggling through different parameters of DVD disc 44
62 previous button of control panel 52 of controller 20 when depressed is for going to previous track of DVD disc 44
64 next button of control panel 52 of controller 20 when depressed is for going to next track of DVD disc 44
66 LCD display of control panel 52 of controller 20 is for displaying different parameters of DVD disc 44 and time
68 video-in jack of control panel 52 of controller 20 provides for receiving external video lead
70 pair of audio-in jacks of control panel 52 of controller 20 provide for receiving external audio leads
72 pair of volume buttons of control panel 52 of controller 20 when depressed is for changing volume of DVD disc 44

5. DETAILED DESCRIPTION OF THE PREFERRED EMBODIMENTS

A. General.

Figure 2:
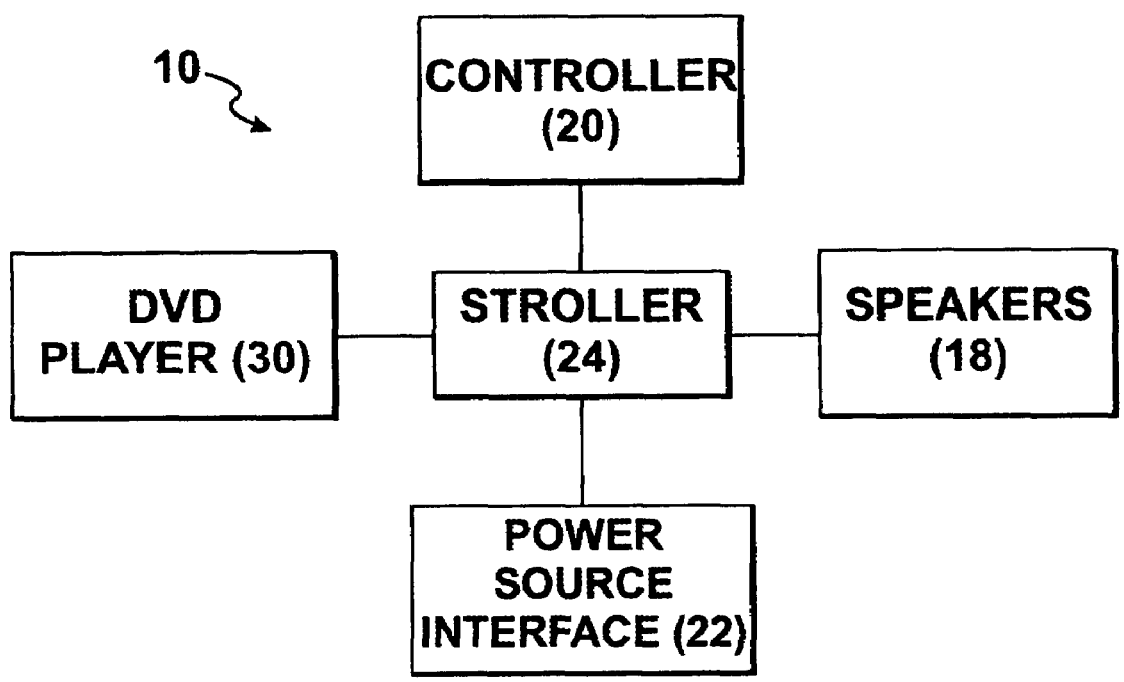
FIG. 2 is a block diagram of the transporter with integral media entertainment and education center for a baby of the embodiments of the present invention shown in FIG. 1.

Referring now to the figures, in which like numerals indicate like parts, and particularly to FIGS. 1 and 2, which are, respectively, a diagrammatic perspective view of the transporter with integral media entertainment and education center for a baby of the embodiments of the present invention, and, a block diagram of the transporter with integral media entertainment and education center for a baby of the embodiments of the present invention shown in FIG. 1, the transporter with integral media entertainment and education center of the embodiments of the present invention is shown generally at 10 for a baby 12.

B. The Transporter with Integral Media Entertainment and Education Center 10.

The transporter with integral media entertainment and education center 10 comprises a transporter 14, a media center 16, speakers 18, a controller 20, and a power source interface 22. In an embodiment of the present invention, the transporter 14 is a stroller 24 having a hood 26 and a handle 28, and the media center 16 is a DVD player 30.

The DVD player 30 replaceably depends from the hood 26 of the stroller 24 and is for viewing by the baby 12 lying on the back in the stroller 24 for entertaining and educating the baby 12. The speakers 18 are in electrical communication with the DVD player 30, are at the stroller 24, and are for listening by the baby 12 lying in the stroller 24. The controller 20 is at, the handle 28 of the stroller 24 and is in electrical communication with, and controls, the DVD player 30. The power source interface 22 is at the stroller 24, is in electrical communication with the DVD player 30, and is for electrically communicating with a power source 32, such as batteries, for powering the DVD player 30.

The hood 26 of the stroller 24 has an interior 34 and a frame 36, and the stroller 24 has a frame 37. The DVD player 30 replaceably depends from the frame 36 of the hood 26 of the stroller 24. The speakers 18 are either at the interior 34 of the hood 26 of the stroller 24, the frame 36 of the hood 26 of the stroller 24, or the frame 37 of the stroller 24.

C. The DVD Player 30.

The configuration of the DVD player 30 can best be seen in FIG. 3, which is an enlarged diagrammatic perspective view of the area generally enclosed by the dotted curve identified by ARROW 3 in FIG. 1 of the media entertainment and education center of the transporter with integral media entertainment and education center for a baby of the embodiments of the present invention, and as such, will be discussed with reference thereto.

The DVD player 30 comprises a base 38 and a screen 40. The base 38 of the DVD player 30 replaceably depends from the frame 36 of the hood 26 of the stroller 24 so as to form an overhead The screen 40 of the DVD player 30 is pivotally attached to the base 38 of the DVD player 30 to pivot between a stowed position where it pivots flat to the base 38 of the DVD player 30 and a use position where it pivots down from the base 38 of the DVD player 30 for viewing by the baby 12 lying on the back in the stroller 24.

The base 38 of the DVD player 30 has a blind slot 42 therein. The blind slot 42 in the base 38 of the DVD player 30 is for receiving a DVD disc 44 for viewing by the baby 12 lying on the back in the stroller 24.

The DVD player 30 further comprises a bag 46. The bag 46 stores and protects the DVD player 30 when the DVD player 30 is removed from the hood 26 of the stroller 24 when the stroller 24 is left unattended.

D. The Controller 20.

The configuration of the controller 20 can best be seen in FIG. 4, which is an enlarged diagrammatic perspective view of the area generally enclosed by the dotted curve identified by ARROW 4 in FIG. 1 of the controller of the transporter with integral media entertainment and education center for a baby of the embodiments of the present invention, and a such, will be discussed with reference thereto.

The controller 20 comprises a housing 48, circuitry 50, and a control panel 52. The housing 48 of the controller 20 is disposed at the handle 28 of the stroller 24. The circuitry 50 of the controller 20 is contained in the housing 48 of the controller 20 and is in electrical communication with, and controls, the DVD player 30. The control panel 52 of the controller 20 is on the housing 48 of the controller 20 and is in electrical communication with, and controls, the circuitry 50 of the controller 20.

The control panel 52 of the controller 20 comprises a power button 54, an eject button 56, a play/stop button 58, a mode button 60, a previous button 62, a next button 64, an LCD display 66, a video-in jack 68, a pair of audio-in jacks 70, and a pair of volume buttons 72.

The power button 54 when depressed powers the DVD player 30. The eject button 56 when depressed is for ejecting the DVD disc 44 from the DVD player 30. The play/stop button 58 when depressed is for either playing or stopping playing the DVD disc 44. The mode button 60 when depressed is for toggling through different parameters of the DVD disc 44, such as amount of bass, amount of treble, etc. The previous button 62 when depressed is for going to a previous track of the DVD disc 44. The next button 64 when depressed is for going to a next track of the DVD disc 44. The LCD display 66 is for displaying different parameters of the DVD disc 44 and time. The pair of volume buttons 72 when depressed are for changing volume of the DVD disc 44

E. CONCLUSIONS

It will be understood that each of the elements described above, or two or more together, may also find a useful application in other types of constructions differing from the types described above.

While the embodiments of the present invention have been illustrated and described as embodied in a baby transporter with integral media entertainment and education center, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can, by applying current knowledge, readily adapt them for various applications without omitting features that, from the standpoint of prior art, fairly constitute characteristics of the generic or specific aspects of the embodiments of the present invention.

The invention claimed is:

1. A transporter with integral media entertainment and education center for a baby, comprising:
   a) a stroller;
   b) a DVD player;
   c) a controller; and
   e) a power source interface;
   wherein said stroller has a hood;
   wherein said DVD player replaceably depends from said hood of said stroller;
   wherein said DVD player comprises a base;
   wherein said DVD player comprises a screen;
   wherein said base of said DVD player replaceably depends from said frame of said hood of said stroller so as to form an overhead; and
   wherein said screen of said DVD player is pivotally attached to said base of said DVD player to pivot between a stowed position where it pivots flat to said base of said DVD player and a use position where it pivots down from said base of said DVD player for viewing by the baby;
   wherein said DVD player is for viewing by the baby to entertain and educate the baby;
   wherein said controller controls said DVD player;
   wherein said power source interface is at said stroller; and
   wherein said power source interface is for electrically communicating with a power source to power said DVD player.

2. The transporter of claim 1, wherein said hood of said stroller has a frame; and
   wherein said DVD player replaceably depends from said frame of said hood of said stroller.

3. The transporter of claim 1, wherein said hood of said stroller has an interior; and
   wherein speakers are at said interior of said hood of said stroller.

4. The transporter of claim 2, wherein speakers are at said frame of said hood of said stroller.

5. The transporter of claim 1, wherein said stroller has a frame; and
   wherein speakers are at said frame of said stroller.

6. The transporter of claim 1, wherein said base of said DVD player has a blind slot therein; and
   wherein said blind slot in said base of said DVD player is for receiving a DVD disc for viewing by the baby.

7. The transporter of claim 1, further comprising a bag; and
   wherein said bag stores and protects said DVD player when said DVD player is removed from said hood of said stroller.

8. The transporter of claim 1, wherein said controller comprises a housing;
   wherein said controller comprises circuitry;
   wherein said controller comprises a control panel;
   wherein said circuitry of said controller is contained in said housing of said controller;
   wherein said circuitry of said controller controls said DVD player;
   wherein said control panel of said controller is on said housing of said controller;
   wherein said control panel of said controller is in electrical communication with said circuitry of said controller; and
   wherein said control panel of said controller controls said circuitry of said controller.

9. The transporter of claim 8, wherein said control panel of said controller comprises a power button;
   wherein said control panel of said controller comprises an eject button;
   wherein said control panel of said controller comprises a play/stop button;
   wherein said control panel of said controller comprises a mode button;
   wherein said control panel of said controller comprises a previous button;
   wherein said control panel of said controller comprises a next button;
   wherein said control panel of said controller comprises an LCD display;
   wherein said control panel of said controller comprises a video-in jack;
   wherein said control panel of said controller comprises a pair of audio-in jacks;
   wherein said control panel of said controller comprises a pair of volume buttons;
   wherein said power button of said control panel when depressed powers said DVD player;

wherein said eject button of said control panel when depressed is for ejecting the DVD disc from said DVD player;

wherein said play/stop button of said control panel when depressed is for one of playing and stopping playing the DVD disc;

wherein said mode button of said control panel when depressed is for toggling through different parameters of the DVD disc;

wherein said previous button of said control panel when depressed is for going to a previous track of the DVD disc;

wherein said next button of said control panel when depressed is for going to a next track of the DVD disc;

wherein said LCD display of said control panel is for displaying different parameters of the DVD disc;

wherein said LCD display of said control panel is for displaying time; and wherein said pair of volume buttons of said control panel when depressed are for changing volume of the DVD disc.

\* \* \* \* \*